United States Patent [19]
McConica et al.

[11] Patent Number: 4,811,141
[45] Date of Patent: Mar. 7, 1989

[54] HEAD MOUNTING IN MAGNETIC STORAGE DEVICES

[75] Inventors: Charles H. McConica, Windsor; Eugene A. Miksch, Loveland; Mark E. Wanger, Ft. Collins, all of Colo.

[73] Assignee: Hewlett-Packard Company, Palo Alto, Calif.

[21] Appl. No.: 163,339

[22] Filed: Mar. 2, 1988

Related U.S. Application Data

[62] Division of Ser. No. 864,164, May 16, 1986, Pat. No. 4,750,069.

[51] Int. Cl.⁴ .......................... G11B 5/12; G11B 5/56
[52] U.S. Cl. .................................. 360/110; 360/104; 360/109; 360/137
[58] Field of Search .................. 360/104, 109, 110, 75, 360/137

[56] References Cited

U.S. PATENT DOCUMENTS

| | | | |
|---|---|---|---|
| 4,456,938 | 6/1984 | Baasch et al. | 360/109 |
| 4,458,274 | 7/1984 | Charlson et al. | 360/76 X |
| 4,485,420 | 11/1984 | Schoenmakers | 360/109 X |
| 4,605,978 | 8/1986 | Zeavin | 360/104 |

*Primary Examiner*—John H. Wolff
*Attorney, Agent, or Firm*—Jeffery B. Fromm

[57] ABSTRACT

Techniques are described for securing a magnetic head to a support carrier for the head in a magnetic storage device (e.g., a tape drive apparatus or disk drive apparatus). One such technique involves temporarily supporting a magnetic head on a fixture which is adapted to cooperate with openings on the magnetic head to orient the head in a predetermined alignment attitude so that the head may be permanently mounted in the magnetic storage device. In another embodiment the fixture may be part of the magnetic storage device itself. There are also provided various embodiments of magnetic heads having openings for accessing a planar interface between the halves of a magnetic core within the head. By accessing this interface the magnetic head may be aligned in a predetermined alignment attitude.

3 Claims, 6 Drawing Sheets

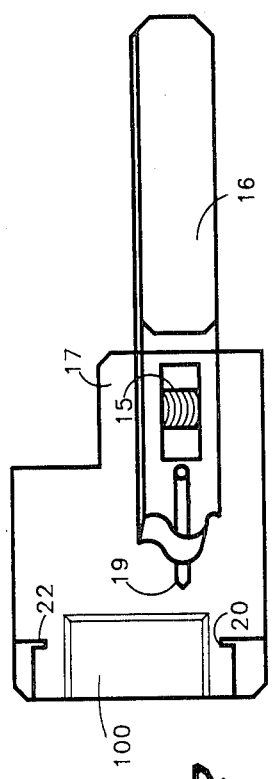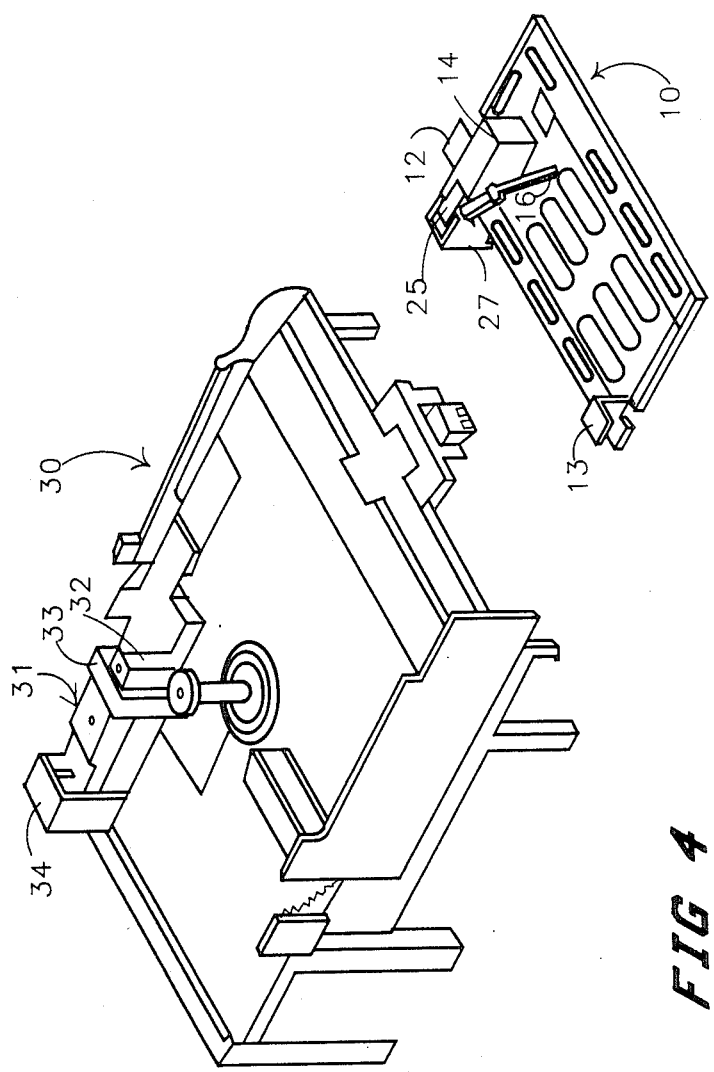

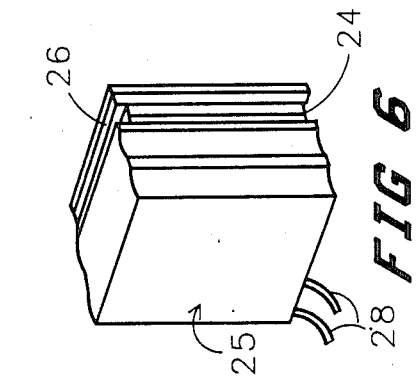
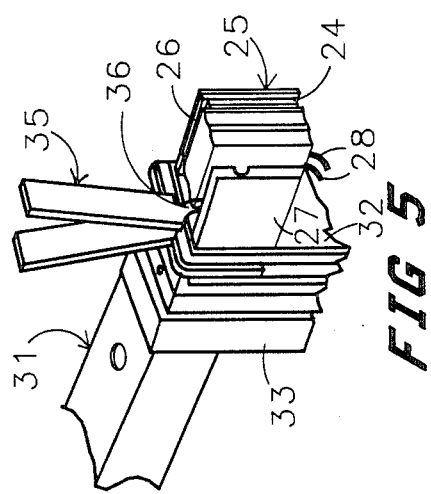
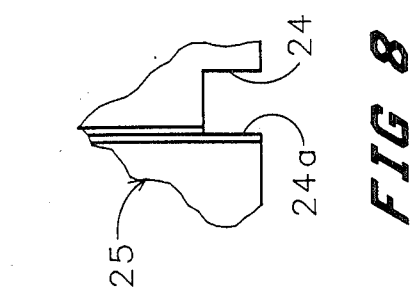
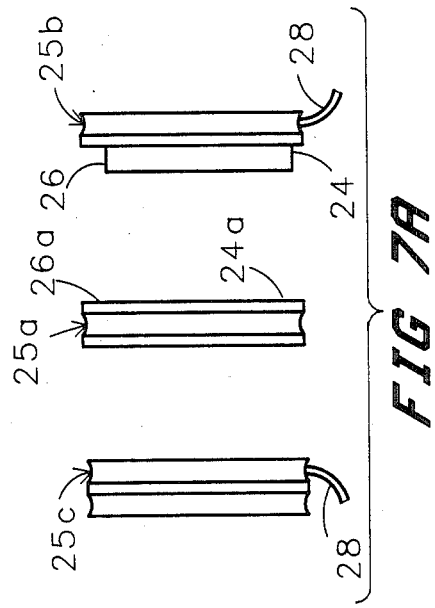
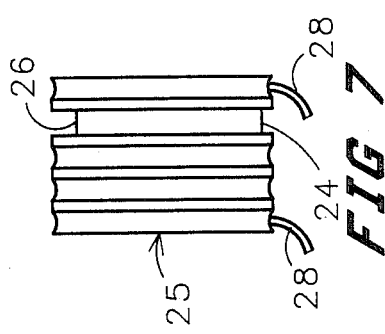

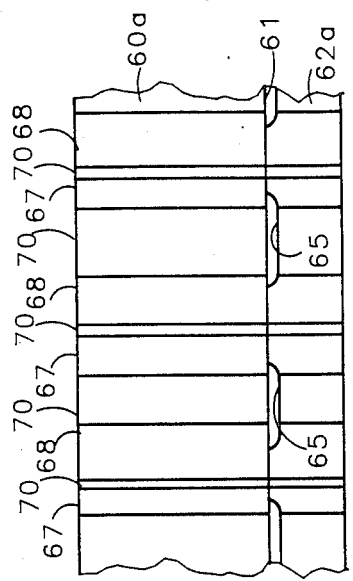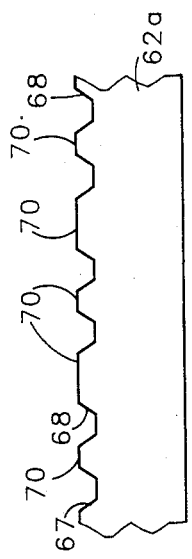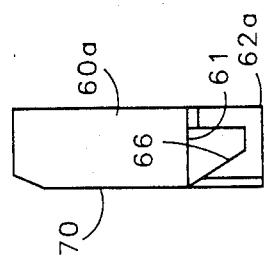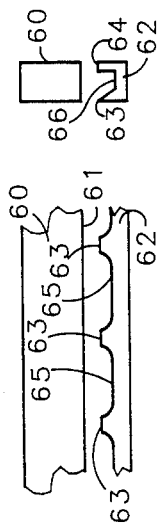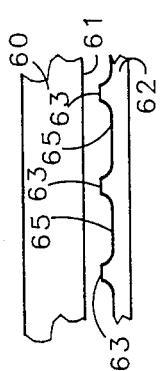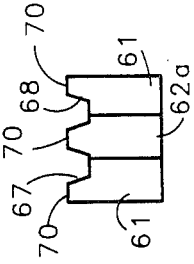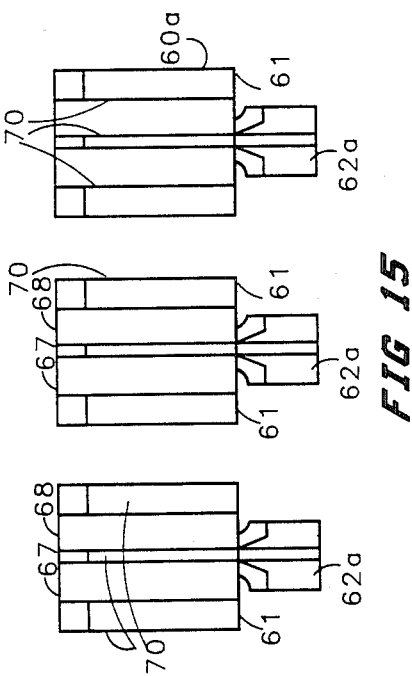

HEAD MOUNTING IN MAGNETIC STORAGE DEVICES

CROSS REFERENCE TO RELATED APPLICATION

This is a division of application Ser. No. 864,164 filed May 16, 1986 now U.S. Pat. No. 4,750,069.

FIELD OF THE INVENTION

This invention relates to magnetic storage devices. More particularly, this invention relates to techniques for mounting and securing magnetic heads (e.g., read/write heads) in such devices. Even more particularly, this invention relates to techniques for obtaining proper alignment of magnetic heads in such devices at the time of mounting.

BACKGROUND OF THE INVENTION

The proper alignment of a head in a magnetic storage device (e.g., tape drive apparatus or hard disk apparatus) is extremely critical. Thus, for optimum performance in a tape drive apparatus the tape must be in intimate contact with the head and accurately aligned to it. In a magnetic disk storage device, the head must also be properly aligned and mounted relative to the magnetic disk.

In a tape drive apparatus the most important alignment parameters which must be controlled are those which influence azimuth angle, tape flying height (distance between the tape and the head), and off-track error. The azimuth angle (head-gap to tape-path angle) affects phase distortion and signal amplitude. The tape flying height is a function of tape tension, tape wrap angle, head penetration, yaw, zenith and head geometry. Off-track error (head gap position relative to the written track) can introduce erroneous data sensing (e.g., from adjacent tracks).

Some of these parameters may be controlled by factors such as head design, head actuation system, and cartridge referencing (e.g., in a tape drive apparatus). However, the alignment and mounting of the head are extremely critical.

The position of the head is determined by three linear dimensions (penetration, offset, and off-track) and by three angular dimensions (azimuth, yaw, and zenith). The accuracy of placement of the head in each of these dimensions controls the performance of the head.

One manner of aligning and mounting a magnetic head in a magnetic storage device is to temporarily fasten the head to a carrier or support in the device itself and then align the head to the desired position optically. Such technique requires the use of a microscope (at least 500× to 1000×) in order to see the head gap (i.e., the gap between the two halves of the magnetic core for a read head, write head, or a read/write head). Special tooling is required to support the apparatus in a designated plane. Then, using the microscope, it is necessary to visually align the head gap to a position which is believed to be perpendicular to the designated plane.

This is a very time-consuming procedure, and each head must be individually aligned. Operator fatigue and operator error are variables which can easily affect the alignment accuracy. Also, the image quality of the microscope may be very poor, thereby introducing another source of error. This procedure also requires micro-manipulation or adjustment of the head in order to obtain proper alignment. The high cost of the tooling and the other required equipment (including high power microscope) is another disadvantage of this technique. Adjustments in the tooling may also be required in order to maintain accuracy in alignment.

Another manner of aligning a magnetic head in a magnetic storage device involves initially pre-mounting the head in a manner such that it can be moved slightly in order to align the azimuth prior to permanent mounting. Then the head is magnetically aligned using a specially prepared magnetic media (e.g., a tape, floppy disk, etc.) which has the flux transitions recorded at predetermined azimuth errors in a manner such that the amplitude of the signals read by an azimuth aligned head correspond with a predetermined pattern. One disadvantage of this technique is that it requires use of a specially prepared magnetic media which is expensive. Also, some of the allowable tolerance is already lost due to errors in the recording of the media itself. Furthermore, each head must be individually aligned. This technique also requires micro-manipulation or adjustment of the head during alignment.

Another manner of aligning and mounting a magnetic head (of the type having at least a pair of gaps on the same gap plane) in a magnetic storage device such as a tape drive apparatus involves the use of a precision fixture which simulates a tape cartridge or cassette. The head is aligned and clamped to the fixture. Then the fixture is inserted into the tape drive apparatus which clamps and references the fixture to the drive mechanism. This procedure fixes five of the degrees of freedom (all but the azimuth). The head is then tacked with adhesive to a bracket, which in turn is held to the tape drive by a small removable clamp. The preliminary fixture simulating a tape cartridge is then removed and the head is ready for azimuth adjustment. The small removable clamp holds the head and bracket assembly against the head carrier but it allows rotation of the head so as to enable adjustment of the azimuth angle.

A special tape cartridge can then be inserted into the drive, the cartridge being preformatted with keys written across the width of the tape and spaced a certain distance apart. By reading the keys with one vertical pair of in-line gaps (one read gap and one write gap) the time delay between the arrival of a key at each gap can be measured. The azimuth angle can then be calculated. Then the head can be rotated relative to the head carrier until the proper azimuth is obtained. At that time the head may be permanently fastened in place (e.g., with adhesive) on the carrier.

There are several disadvantages associated with the foregoing technique. For example, it may only be used when there are two or more gaps in the same plane. Specially prepared magnetic media is required. Some of the allowable tolerance is lost due to errors in the manufacture of the special magnetic media. Each head must also be individually aligned, and micro-adjustment is required. This also is a time-consuming technique, and special equipment is required.

Yet another technique for aligning a magnetic head involves a reference surface transfer. In this technique it is necessary to grind an external surface of the magnetic head to form a surface which is either perpendicular to the gap surface or parallel to the gap surface. The surface which has been so ground is then used as a reference surface to determine alignment of the head. One disadvantage of this technique is that the magnetic head becomes more costly because of the precision grinding required. Also, some tolerance is lost due to the grinding process. This technique may be used as the preliminary mounting procedure when using any of the other foregoing techniques when tight tolerance is required.

SUMMARY OF THE PRESENT INVENTION

In accordance with the present invention there are provided novel techniques for aligning and mounting a magnetic head in a magnetic storage device (e.g., tape drive apparatus or magnetic disk apparatus). There are also provided fixtures which facilitate the alignment and mounting of a magnetic head to a support carriage in the magnetic storage device.

In another embodiment there are provided novel magnetic head configurations which include alignment means for enabling the head to be quickly and accurately aligned for mounting purposes in a magnetic storage device.

Utilizing the principles and techniques of this invention a magnetic head is configured such that access may be gained to the plane which defines the interface between the two halves of a magnetic core in the head. Then the head is mounted on a fixture which causes the plane or interface to be properly aligned before the head is permanently secured to a support carriage in the magnetic storage device. Thus, the head is very accurately aligned in a one step procedure which is very rapid. This reduces assembly time and minimizes or eliminates opportunities for human error or instrument error in obtaining proper alignment. No measurements need be taken during assembly to determine proper alignment of the head.

Furthermore, the fixturing or tooling used in the present invention is substantially lower in cost than anything used previously. Moreover, there is no need to adjust or manipulate the head during mounting. Also, the present invention avoids the need for using specially prepared magnetic media in order to align the head. Thus, the technique of the present invention avoids the tolerance loss which is inherent in the manufacture and use of specially prepared magnetic media.

The techniques of the present invention also avoid the error inherent in the use of an external reference surface. Use of the techniques of the preset invention results in considerably total cost savings for a mounted magnetic head.

Other advantages will be apparent from the following description.

BRIEF DESCRIPTION OF THE DRAWINGS

The invention is described in more detail hereinafter with reference to the accompanying drawings, wherein like reference characters refer to the same parts throughout the several views and in which:

FIG. 2 is a front view of the portion of the fixture of FIG. 1 which is adapted to hold and align a magnetic head during the mounting procedure;

FIG. 4 is a perspective view illustrating the manner in which a magnetic head is temporarily held and supported by the fixture prior to insertion into a tape drive assembly;

FIG. 5 illustrates one manner of temporarily supporting the magnetic head on the head support carrier during the mounting process;

FIG. 6 illustrates one embodiment of magnetic head design of this invention;

FIG. 7 is a front view of the magnetic head shown in FIG. 6;

FIG. 7A is an explosion view illustrating the separate components of the magnetic head shown in FIGS. 6 and 7;

FIG. 8 is a front view, enlarged, of a portion of the magnetic head illustrated in FIGS. 6 and 7;

FIG. 11 is a top view illustrating a precursor of another embodiment of magnetic head of the present invention;

FIG. 12 is a side view of the magnetic head precursor shown in FIG. 11;

FIG. 13 is a top view illustrating the magnetic head precursor of FIG. 11 after additional processing steps;

FIG. 14 is an end view of the magnetic head precursor shown in FIG. 13;

FIG. 15 is a top view of several magnetic heads (i.e., sliders) produced from the precursor shown in FIG. 13;

FIG. 16 is a side view of one of the magnetic heads shown in FIG. 15;

FIG. 17 is an end view of one of the magnetic heads shown in FIG. 15; and

DETAILED DESCRIPTION OF THE INVENTION

Figure 1:
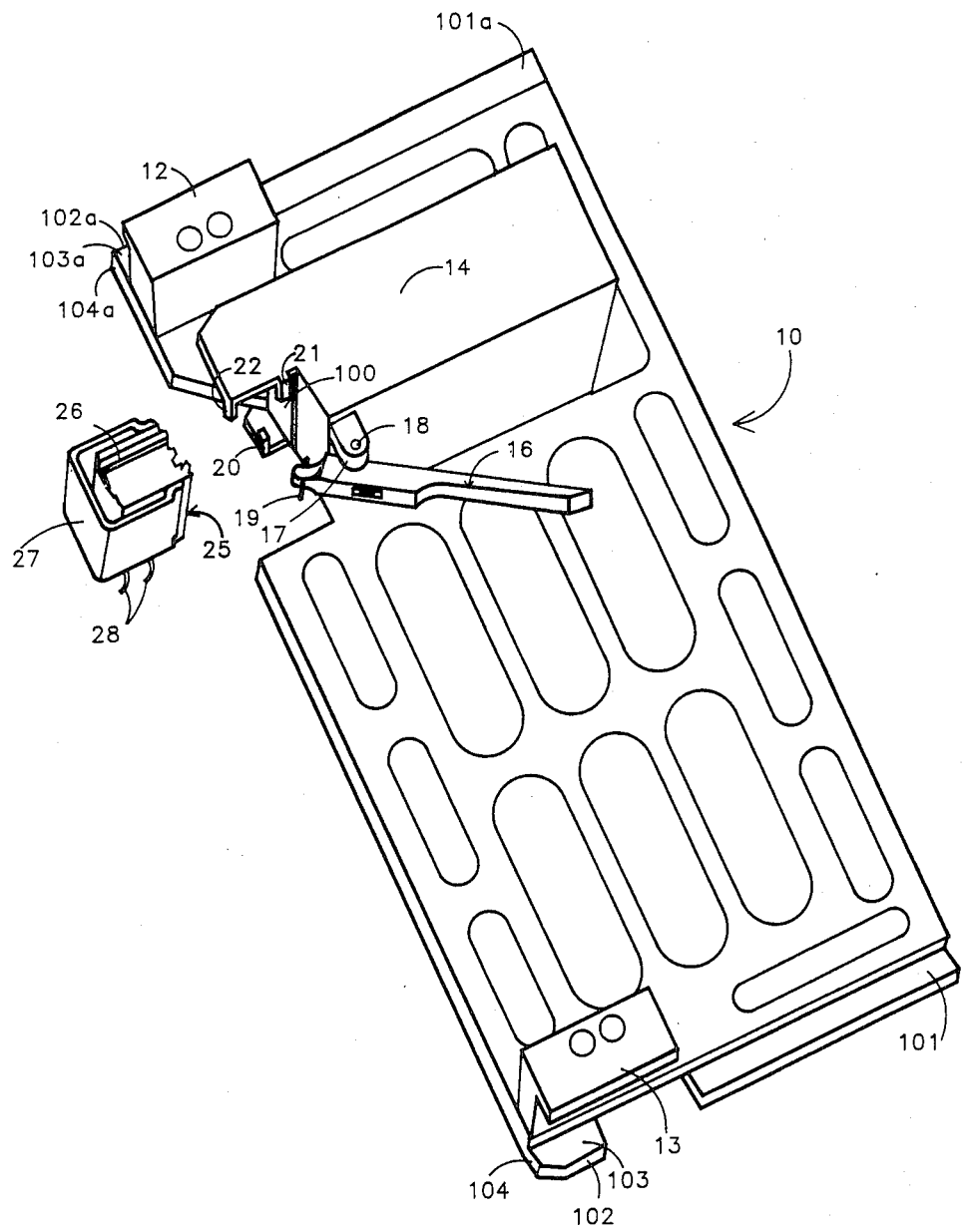
FIG. 1 is a perspective view of a preferred embodiment of a fixture which is useful in the practice of this invention.
Figure 3:
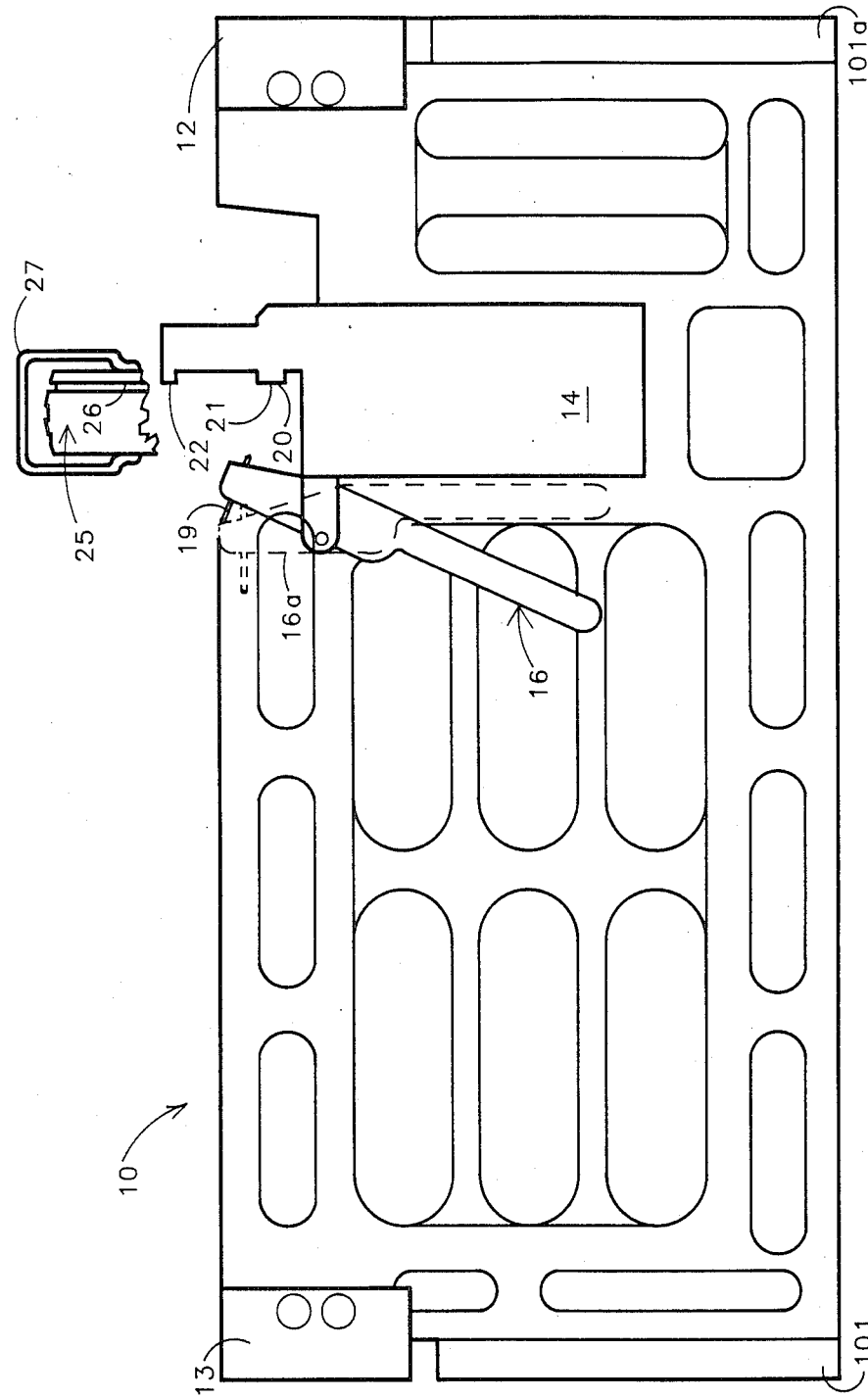
FIG. 3 is a top view of the fixture shown in FIG. 1 prior to insertion of the magnetic head.

In FIGS. 1, 2 and 3 there is shown a fixture 10 which simulates a tape cartridge or tape cassette which is adapted to be inserted into a conventional tape drive apparatus. The fixture includes a base portion which is identical to a particular tape cartridge base of the type which is compatible with the particular tape drive apparatus in which a magnetic head is to be mounted. The tape drive apparatus accurately locates and holds the fixture when it is inserted into the tape drive apparatus. Therefore, the magnetic head (when held in the fixture) will be properly located and oriented relative to where the tape media travels when the fixture is placed into the tape drive apparatus.

The fixture 10 includes eject actuator blocks 12 and 13 on opposite ends along the front edge to simulate cartridge surfaces. The fixture also includes a block 14 on which is carried arm support 17. Arm 16 is pivotably mounted to support 17 by means of pin 18. The inner end of arm 16 includes a pin or rod 19, as illustrated. Block 14 also includes tabs 20, 21, and 22. These three tabs define a plane and therefore define a precise alignment attitude of magnetic head 25 as hereafter described in more detail.

The American National Standards Institute (ANSI) provides specifications and standards for various types of cartridges of different sizes (e.g., DC-100). Such specifications and standards specify the various dimensions, etc. for the cartridges.

In the fixture 10 shown in FIGS. 1, 2 and 3 the planar surface 100 is a tape simulation surface which sets the zenith and the penetration of magnetic head 25 in the fixture. The cartridge referencing system includes surfaces 101, 101a, 102, 102a, 103, 103a, 104 and 104a.

Magnetic head 25 includes a groove or slot 26 along its top surface. A corresponding groove or recess is contained on the bottom surface of the head 25. Magnetic head 25 is adapted to be slidingly received onto tabs 20, 21, and 22 when arm 16 is pivoted in the manner illustrated by dotted lines 16a in FIG. 3. That is, tabs 22 and 21 are received in groove or recess 26, and tab 20 is received in the groove or recess 24 (shown in FIGS. 6, 7 and 8) on the bottom of head 25. Pin 19 on arm 16 is adapted to be biased (e.g., by means of spring 15) against one edge surface of head 25 in a manner such that head 25 is maintained in a predetermined alignment or position relative to fixture 10 as defined by tabs 20, 21 and 22.

Bracket 27 is adapted to slip onto and frictionally engage magnetic head 25 and will serve as a mounting bracket during the assembly process. Wires 28 are operatively connected to the magnetic core in head 25.

In FIG. 4 there is illustrated fixture 10, having magnetic head 25 temporarily supported thereon, and there is also shown conventional tape drive apparatus 30. Fixture 10, since it simulates a tape cartridge or tape cassette compatible with the tape drive apparatus, may be slidingly engaged within tape drive apparatus 30 in the same manner as a tape cartridge would be inserted therein. After fixture 10 has been fully inserted into tape drive apparatus 30, mounting bracket 27 will abut against the front edge 32 of head carrier support 31 in tape drive 30. Head support carrier 31 is mounted within frame members 33 and 34 in a manner such that the carrier may be made to move vertically during the normal operation of the completed tape drive apparatus to access various tracks on magnetic tape in a tape cartridge.

FIG. 5 illustrates one manner in which the mounting bracket 27 may be held firmly in place against front edge 32 of head carrier 31 during the mounting process. Spring clip 35 is adapted to be slidingly received onto the front portion of head carrier 31 and is also adapted (via finger 36) to temporarily secure mounting bracket 27 flat against front edge 32 of carrier 31. The magnetic head 25 is still supported in proper alignment attitude by means of fixture 10 (not shown in this figure). Then a small amount of adhesive may be placed along the abutting surfaces of bracket 27 and front edge 32 of carrier 31 so as to spot tack bracket 27 to the carrier 31. A small amount of adhesive is also applied to abutting edges of magnetic head 25 and bracket 27 so as to spot tack the head 25 to bracket 27. In this manner the magnetic head 25 is fixed in position relative to bracket 27, and bracket 27 is fixed in position relative to head carrier 31. After the spring clip 35 is removed a more permanent bonding adhesive is applied to all abutting surfaces of magnetic head 25 and bracket 27 to permanently secure the head to the bracket. Permanent adhesive is also applied at this time to all abutting surfaces of bracket 27 and front edge 32 of head carrier 31. After the adhesive has cured the magnetic head is thereby permanently and fixedly secured to the head carrier 31 in proper alignment attitude as required for proper use in the tape drive apparatus 30.

Thus, the fixture illustrated in FIGS. 1-4 simulates a tape cartridge or tape cassette and is capable of temporarily holding and positioning a magnetic tape head while anchoring it to the support carrier or support carriage during the manufacture and assembly of tape drive apparatus. The fixture is adapted to hold the magnetic head in the very precise alignment attitude which is required in order to properly and permanently anchor or mount the magnetic head to the tape drive apparatus.

Although the fixture 10 is shown and illustrated as having alignment means comprising tabs 20, 21 and 22, instead of tabs there may be used rails, for example, or a combination of rails and tabs, if desired.

The tabs 20, 21 and 22 and the tape simulation surface 100 are ground by first mounting the fixture using the cartridge referencing system 101-104 and 101a-104a and then grinding in a manner such that surface 100 and tabs 20, 21 and 22 define a particular desired head orientation as required for a given tape apparatus. Accordingly, when magnetic head 25 is then slid onto the tabs and moved into contact with surface 100, the fixture 10 thereby sets the orientation of the head in the manner required for mounting in a particular tape drive apparatus.

FIGS. 6, 7, 7A and 8 illustrate in more detail one embodiment of a preferred magnetic head design of this invention. As illustrated, in this embodiment there is a groove or recess 26 along the top edge of the magnetic head, and there is a similar groove or recess 24 along the bottom surface of the magnetic head. In the embodiment the grooves or recesses 24 and 26 are placed in a manner such that one edge of each groove or recess corresponds with the plane defining the interface between the I-block and the C-block of the magnetic head. One-half of the magnetic core of the magnetic head is contained within the I-block and the other half of the magnetic core is contained within the C-block. The head gap between the two halves of the magnetic core is within the interface between the I-block and the C-block. It is this interface between the two halves of the magnetic core which is used in accordance with the present invention for determining and obtaining proper alignment during the head mounting procedures. This is illustrated in more detail in the explosion view of FIG. 7A in which the I-block 25a is sandwiched between two C-blocks 25b and 25c, as shown. In the embodiment shown in FIG. 7A the I-block 25a and C-block 25c each form one-half of a magnetic core, and I-block 25a and C-block 25b each form one-half of another magnetic core. Groove or recess 26 along the top edge of C-block 25b, and groove 24 along the bottom edge of C-block 25b, are formed or cut prior to assembly of head 25. Thus, grooves 24 and 26 are low tolerance recesses (i.e., larger or wider than required). Therefore, after assembly of head 25 the inner wall 26a of groove 26 and inner wall 24a of groove 24 are defined by the surface of the I-block 25a (which is a highly polished surface resulting from the conventional manufacturing techniques for I-blocks). This polished surface defines the interface between the I-block 25a and the C-block 25b.

In the embodiment shown in FIGS. 6, 7, 7A and 8 the grooves 24 and 26 are disposed in a manner such that one edge or wall of each such groove corresponds with the interface between the two halves of the magnetic core, as described above. In this manner it is possible to obtain precise alignment of the magnetic head by placing the head onto a fixture (such as shown in FIGS. 1, 2 and 3) in a manner such that the edge of each groove or recess which corresponds with the interface between the two halves of the magnetic core is positioned against a tab or rail whose position corresponds exactly with what is required for proper alignment of a magnetic head for a particular tape drive apparatus.

Figure 9:
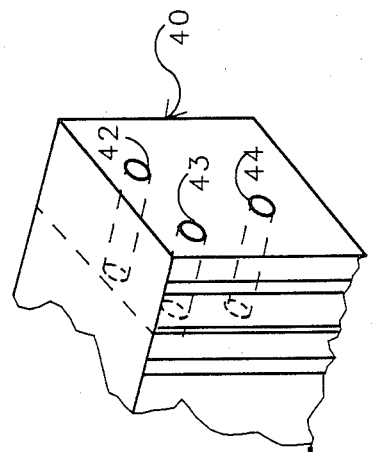
FIG. 9 is a partial perspective view of another embodiment of magnetic head design of this invention.

In FIG. 9 there is illustrated another embodiment of magnetic head 40 of this invention which also contains means for accessing the interface between the I-block and the C-block. In this embodiment there are provided a plurality of apertures 42, 43 and 44 extending through the C-block. The apertures extend inwardly to the surface of the I-block which defines the interface between the two halves of the magnetic core. Accordingly, this embodiment of magnetic head may be properly aligned by means of a fixture which includes pins, for example, which are adapted to be slidingly received by apertures 42, 43 and 44. Instead of extending through the C-block the apertures may instead be provided through the I-block to the surface of the C-block.

Figure 10:
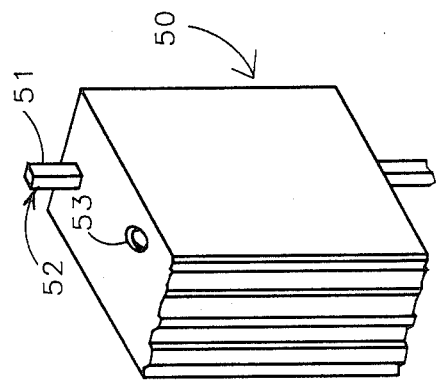
FIG. 10 is a perspective view illustrating yet another embodiment of magnetic head design of this invention.

In FIG. 10 there is shown another embodiment of magnetic head design 50 of this invention. In this embodiment there is a square or rectangular aperture extending vertically through head 50 which is adapted to slidingly receive a correspondingly shaped shaft 52, as illustrated. The aperture (and the shaft extending through the aperture) may be of any cross-sectional configuration, e.g., circular or non-circular, such as semi-circular, oval, polygonal (e.g., square, triangular, rectangular, etc.). The head 50 also may include a threaded aperture 53 which is adapted to receive a threaded rod or shaft (not shown). Head 50 may then be moved vertically along shaft 52 in a tape drive apparatus, for example, in response to rotation of the threaded shaft in aperture 53. One surface 51 of shaft 52 is positioned such that it corresponds with the plane defining the interface between the I-block and the C-block i.e., between the two halves of the magnetic core) of the magnetic head.

If desired, the cross-sectional shape of the shaft may be complementary to the shape of the aperture, or the shaft may fit within the aperture along with something else (e.g., a key, or a spring). It is also possible for the shaft to comprise more than one piece. A portion of the shaft contacts the interface between the two halves of the magnetic core.

As used in the present invention, the term magnetic head refers to and includes any head which includes two halves of a magnetic core positioned in the head so as to form a gap. The magnetic head may include one or several of such gaps. The magnetic head may function as a read head, a write head, or as both. Indeed, a single magnetic head may include more than one read or write gap. Also, a single magnetic head may include more than one gap surface (e.g., as illustrated in FIGS. 6, 7 and 7A).

The term magnetic head as used herein also includes what is known in the art as a thin film head where the magnetic layers are built up on a lapped surface using thin film deposition processes.

Utilizing the principles of the present invention it is also possible to access the interface between the two halves of the magnetic core in various other manners. For example, instead of using a fixture which includes tabs or rails or protrusions to physically contact the interface, it is also within the scope of the present invention to use light beams (e.g., laser beams). In other words, one or more laser beams may be directed at the interface (e.g., through apertures, grooves, slots, etc.) in order to determine the exact alignment of the magnetic head. This may be done using a three point distance technique or an auto-columnation technique.

In FIGS. 11-17 there is illustrated a process for forming another type of magnetic head in accordance with the principles of the present invention. In FIG. 11 there is shown a top view of portions of two magnetic ceramic materials 60 and 62. These two materials eventually form the two halves of a magnetic core. Material 60 includes one edge 61 which is a lapped surface. Material 62 includes raised portions 63, separated by channels 65. The top surface of each raised portion 63 is also a lapped surface. A side view of these materials 60 and 62 is shown in FIG. 12. Material 60 forms the I-block, and material 62 forms the C-block of the magnetic core. Cavity 66 separates raised portions 63 and 64. The gap is formed between raised portion 63 and lapped edge 61. Contact between raised portion 64 and lapped edge 61 forms the flux return path.

In FIG. 13 there is shown a top view of the magnetic head precursor in which lapped surface 61 of material 60 has been bonded to the top surface of raised portion 63 of material 62 (e.g., they have been bonded together by means of a conventional glass bonding technique well known in the art). Then channels 67 and 68 have been ground into the top surface of the structure so as to leave ridges 70 spaced therealong (as illustrated in FIGS. 13 and 14). FIG. 14 is an end view of the precursor shown in FIG. 13.

The precursor structure of FIG. 13 is then sliced or cut into individual sliders (i.e., mini-monolithic magnetic heads) as illustrated in FIG. 15. Subsequent to that operation portions of material 62a are removed so as to leave exposed areas of surface 61 (which is the interface between the two halves of the magnetic core).

FIG. 16 is a side view of one of the individual sliders shown in FIG. 15. FIG. 17 is an end view of one of the sliders of FIG. 15.

Figure 18:
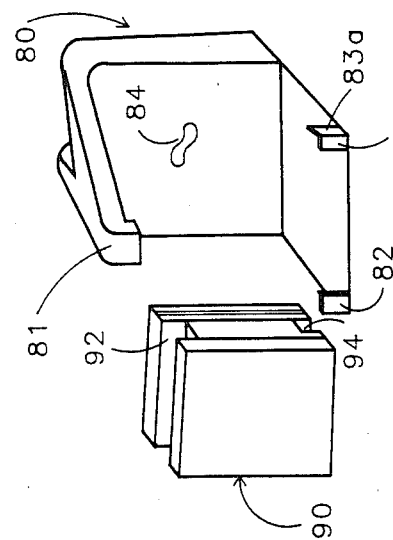
FIG. 18 is a perspective view illustrating an embodiment of a fixture which is an integral part of a magnetic storage device in accordance with the techniques of the present invention.

Another variation of the invention is illustrated in FIG. 18. Thus, there is shown a mounting fixture 80 which may be permanently mounted or secured to a magnetic storage device (e.g., tape drive apparatus). For example, fixture 80 may be made of plastic, and it may be molded or cast as an integral unit of the tape drive apparatus or as a portion thereof. Alternatively, the fixture 80 may be molded separately (e.g., of plastic) and then permanently mounted on the magnetic storage device.

The fixture 80 includes opposing tabs 81, 82 and 83. As shown in FIG. 18, tab 81 projects downwardly from the top of fixture 80 while tabs 82 and 83 project upwardly from the bottom of the fixture. Tab 83 is L-shaped. Magnetic head 90 has a groove or recess 92 in its top surface and a groove or recess 94 in its bottom surface. Groove 92 is adapted to slidingly receive tab 81, and groove 94 is adapted to slidingly receive tabs 82 and 83 as head 90 is moved forwardly into the fixture 80. Because tab 83 is L-shaped, head 90 is prevented from sliding forwardly after the front edge of head 90 reaches portion 83a of tab 83, thus setting the penetration of the head. Spring 84 on fixture 80 is adapted to urge head 90 outwardly in a manner such that one side of each groove 92 and 94 is urged against the inward surface of tabs 81, 82 and 83.

After magnetic head 90 has been inserted into the fixture 80 as explained and illustrated, head 90 may be securely fastened to the fixture (e.g., by means of adhesive) so as to become a permanent part of the apparatus.

Other variants are possible without departing from the scope of the present invention.

What is claimed is:

1. A fixture interchangeable with a conventional magnetic storage media enclosure employed in a magnetic storage apparatus, said fixture being operative for aligning and supporting a magnetic head for precise and permanent mounting of the magnetic head within the magnetic storage apparatus, the magnetic head being of the type comprising a plurality of sandwiched members, a planar interface being defined between selected ones of said plurality of sandwiched members, the fixture comprising:

alignment means for directly contacting said planar interface and adapted to precisely orient said magnetic head with respect to said fixture in a predetermined alignment attitude; and arm means for selectably holding said magnetic head in said fixture in said predetermined alignment attitude and releasing said magnetic head from said fixture following permanent mounting of said magnetic head in said magnetic storage apparatus.

2. A fixture in accordance with claim 1, wherein said alignment means comprises opposing tab members.

3. A fixture in accordance with claim 1, wherein said alignment mean comprises a plurality of peg members.

* * * * *